United States Patent
Suzuki

[19]

[11] Patent Number: 6,088,074
[45] Date of Patent: Jul. 11, 2000

[54] TRANSPARENT AND SPREAD ILLUMINATING APPARATUS

[75] Inventor: Shingo Suzuki, Asaba-cho, Japan

[73] Assignee: Minebea Co., Ltd., Nagano-Ken, Japan

[21] Appl. No.: 09/236,470

[22] Filed: Jan. 25, 1999

[30] Foreign Application Priority Data

Mar. 5, 1998 [JP] Japan ................... 10-053248

[51] Int. Cl.$^7$ ............... G02F 1/1335; F21V 7/04; F21V 7/00
[52] U.S. Cl. ............... 349/62; 349/63; 349/113; 385/901; 362/31; 362/297
[58] Field of Search .................. 349/61, 62, 63, 349/113; 385/146, 901; 362/31, 26, 297

[56] References Cited

U.S. PATENT DOCUMENTS 5,339,179 8/1994 Rudisill et al. .................. 355/49
5,664,873 9/1997 Kanda et al. .................. 362/97
5,746,493 5/1998 Jonsson et al. .................. 362/31

FOREIGN PATENT DOCUMENTS

C6404 12/1997 Japan .

Primary Examiner—James A. Dudek
Assistant Examiner—Tarifur R. Chowdhury
Attorney, Agent, or Firm—Oliff & Berridge, PLC

[57] ABSTRACT

In a transparent and spread illuminating apparatus closely disposed to cover a surface of a reflection type liquid-crystal display device, a transparent substrate 2 which covers an observation face F of a reflection type liquid crystal display element L is disposed, a light reflection pattern 11 is formed on a top surface 6 of the transparent substrate 2, the light reflection pattern 11 is formed of a plurality of recesses 12 formed at given intervals P1 in parallel with the axial direction of the light source lamp 4 disposed along one side end surface 3, in which assuming that intervals between stripes which are in parallel with the recesses 12 in the arrangement of liquid cells of the reflection type liquid-crystal display device L are P2, the intervals P1 are set to satisfy a relation between P1 and P2:

P1:P2=1:(N+1.3) to 1:(N+1.6)

or

P1:P2=1:1/(N+1.6) to 1:1/(N+1.3)

where N is an integer: 0, 1, 2, 3, . . . . As a result, it is possible to suppress an interference caused by stripes with the interval P1 due to the light reflection pattern 11 and the stripes with intervals P2 due to the reflection type liquid crystal display element L to suppress the occurrence of the moire pattern.

3 Claims, 5 Drawing Sheets

| sample | P1 (mm) | P1:P2 | evaluation |
|---|---|---|---|
| 1 | 0.561 | 1 : 1/1.7 | × |
| 2 | 0.528 | 1 : 1/1.6 | △ |
| 3 | 0.495 | 1 : 1/1.5 | ○ |
| 4 | 0.462 | 1 : 1/1.4 | ○ |
| 5 | 0.429 | 1 : 1/1.3 | △ |
| 6 | 0.396 | 1 : 1/1.2 | × |
| 7 | 0.33 | 1 : 1 | × × |
| 8 | 0.275 | 1 : 1.2 | × |
| 9 | 0.254 | 1 : 1.3 | △ |
| 10 | 0.236 | 1 : 1.4 | ○ |
| 11 | 0.22 | 1 : 1.5 | ○ |
| 12 | 0.206 | 1 : 1.6 | △ |
| 13 | 0.194 | 1 : 1.7 | × |
| 14 | 0.165 | 1 : 2 | × × |

TRANSPARENT AND SPREAD ILLUMINATING APPARATUS

BACKGROUND OF THE INVENTION

1. Field of Invention

The present invention relates to a transparent and spread illuminating apparatus which is formed in a unit with a display unit used in a front-surface illuminating means for a variety of reflection type display units and so on, and more particularly to a transparent and spread illuminating apparatus used as a front-surface illuminating means in a reflection type liquid-crystal display unit.

2. Background of Related Art

A liquid-crystal display unit operable with a low electric power consumption has been increasingly in demand for display units mainly applied to computers because it is thin in configuration, light in weight and so on. Since liquid crystal which is a structural element of the liquid-crystal display unit emits no light by itself, an illuminating means for illuminating an image is required, which is different from a light emission type device such as a CRT. In particular, in the circumstances where a demand of fine and colored image in high level is increased recently, a structure in which a liquid-crystal display unit is backed with a high luminance spread light source is usually used. However, since, in order to illuminate the spread light source, an excessive electric power is required, there occurs such a problem that the feature of liquid crystal having a low electric power consumption is lessened.

In particular, a portable liquid-crystal device frequently used with the advantages of the liquid-crystal display unit thin in configuration and light in weight has a drawback that the consumption of an internal electric power becomes increased due to the illumination of the spread light source which is provided in the liquid-crystal display unit to remarkably shorten a period of illuminating time during for using it as the portable device.

In order to solve the above problem, there has been developed a reflection type liquid-crystal device that may operate by employing an ambient light as an illuminating means even if no spread light source is provided.

The most basic structure of the reflection type liquid-crystal device is designed in such a manner that two flat glass substrates, on each of one surfaces of which a transparent electrode is disposed and on each of the other surfaces of which a polarization plate is disposed, are formed so as to oppose their transparent electrodes to each other at a given interval, and liquid crystal material is filled between the respective glass substrates. Furthermore, a color filter is disposed on the glass substrate which is on an observation face side, and a high-efficient reflector is disposed on the glass substrate which is on a back surface side.

In this example, the transparent electrode plate of the glass substrate which is on the back surface side is patterned, and in order to display a desired image, switching devices are connected to the transparent electrode plate, respectively.

In the reflection type liquid-crystal device thus structured, since an ambient light incident to the reflector disposed on the back surface is reflected so as to illuminate a screen, an image on the screen can be observed.

However, since the reflection type liquid-crystal device has a structure such that, as mentioned above, an ambient light incident to the reflector illuminates the screen, its display quality depends on the ambient brightness. In particular, in demand for high quality concerning image on display, since a constitution of the color display reflection type liquid crystal, the demand of which is expected to be increased, has to become such that the color filter and the like are added thereto, its reflectivity becomes lower than that of monochrome liquid crystal. Accordingly, in a state where the amount of light to be irradiated on the screen is a little (that is, the surrounding is relatively dark), because the luminance of the screen is not sufficient, an auxiliary illumination is required for observing an image.

As an appropriate auxiliary illuminating means for the above reflection type liquid-crystal device, there has been disclosed a transparent and spread illuminating apparatus in Japanese Patent Application No. Hei 9-347648.

A transparent and spread illuminating apparatus 1' shown in FIG. 11 is disposed so as to cover the observation face F of the above-structured reflection type liquid-crystal device L for use, and its structure is such that a linear light source lamp 4 is disposed so as to be close to one side end surface 3 of the flat transparent substrate 2 which is made of a material high in transmittance and shaped in a rectangle in section as shown in FIGS. 11 and 12. As the light source lamp 4, a cold cathode fluorescent tube (CCFL), a heat cathode fluorescent tube (HCFL) or the like is used.

In this example, it is assumed that, in FIG. 12, one surface (a lower side in FIG. 12) of the transparent substrate 2 which abuts on the reflection type liquid-crystal device L is a lower surface 5, and its opposite surface (an upper side in FIG. 12) which is on an observation face (screen) side is a top surface 6.

On the top surface 6 of the transparent substrate 2 is formed a light reflection pattern 7. The light reflection pattern 7 is made up of a large number of grooves 8 which are substantially triangular in section and a large number of flat portions 9 adjacent to the grooves 8.

The light reflection pattern 7 is designed in such a manner that intervals between which the grooves 8 are defined are different depending upon the position of the groove so that the brightness becomes nearly uniform at any positions in the transparent substrate 2 without being influenced by the distances from the light source lamp 4 as shown in FIG. 12. In other words, the ratio of the width (occupied area) of the grooves 8 to the width (occupied area) of the flat portions 9 is set so as to gradually increase as the grooves or the flat portions become farther from the one side end surface 3 of the transparent substrate 2.

With the addition of the transparent and spread illuminating apparatus 1' thus structured as an auxiliary illumination, a light emitted from the light source lamp 4 is made incident to the interior of the transparent substrate 2 from the one side end surface 3 of the transparent substrate 2, and progresses toward the opposite surface 10 while the light repeats reflection and refraction in the interior of the transparent substrate 2. During this action, the light is emitted from the lower surface 5 of the transparent substrate 2 little by little with the result that the light is irradiated on the reflection type liquid-crystal device L which is disposed in close contact with the transparent substrate 2. Moreover, since the light reflection pattern 7 is formed on the transparent substrate 2, the distribution of the light emitted from the lower surface 5 can become substantially uniform entirely thereon.

Although being omitted from showing in FIGS. 11 and 12, since an outer surface of the light source lamp 4 which is not faced on the one side end surface 3 is covered with a film-shaped reflection member, the coupling efficiency of a light can be enhanced. Furthermore, when the side surfaces of the transparent substrate 2 except for the one side end surface 3 are also covered with a reflection member, since the light is prevented from being emitted from the side end surfaces, the amount of light emitted from the lower surface 5 of the transparent substrate 2 can be increased. In particular, on the opposite surface 10 of the one side end surface 3, since the amount of emitted light is larger than those of two other side surfaces, it is desirable that the opposite surface 10 is covered with a reflection member.

Also, since a direction of the light emitted from the lower surface 5 of the transparent substrate 2 varies by changing an angle of reflection of the light in accordance with the configuration of the grooves 8 of the light reflection pattern 7, the configuration of the groove 8 can be appropriately set so that a large amount of light is emitted in a direction perpendicular to the lower surface 5 (that is, a front-surface direction).

As described above, in order to ensure the luminance of the screen of the reflection type liquid-crystal device L, the transparent and spread illuminating apparatus 1' serving as the auxiliary illumination is added to the observation face F side so that the screen can be observed without being influenced by the ambient brightness.

However, it has been found that the addition of the transparent and spread illuminating apparatus 1' may lead to a case where a moire pattern occurs on the observation face F of the reflection type liquid-crystal device L.

The moire pattern is an interference stripe which is caused, when a light is reflected on the light reflection pattern 7 of the transparent substrate 2, by occulting stripes caused by different transmission rate between the grooves 8 and the flat portions 9, and a mosaic-pattern arrangement (a dotted line indicated in the reflection type liquid-crystal device L in FIG. 11) of liquid-crystal cells which form pixels of the reflection type liquid-crystal device L. This moire pattern causes such a problem that an image on screen is difficult to be observed.

As described above, it has been proved that the occurrence of the moire pattern is closely related to the pattern configuration of the light reflection pattern 7, that is, the depth, size and pitch P (a distance from one of the grooves 8 to another groove 8 adjacent thereto), etc., of the grooves 8. Accordingly, as a result of studying the pattern configuration of the light reflection pattern 7 by being variously changed, there has been proved that in the case where the pitches P of the grooves 8 (that is, the widths of the flat portions 9) are not constant as shown in the light reflection pattern 7 in FIG. 12, the large moire pattern occurs locally, thereby to make it difficult to observe the image on screen.

SUMMARY OF THE INVENTION

Therefore, an object of the present invention is to provide a transparent and spread illuminating apparatus in which an auxiliary illuminating device is formed in a unit with a reflection type liquid-crystal display device, thereby to make it possible that the apparatus is used without being influenced by the brightness of surroundings and suppresses the occurrence of the moire pattern that makes it difficult to obverse the image on screen.

In order to achieve the above object, according to a first aspect of the present invention, there is provided a transparent and spread illuminating apparatus closely disposed to cover a front surface of a reflection type liquid-crystal display device, in which a light source lamp is closely disposed along at least one side end surface of a transparent substrate made of a transparent material, a light reflection pattern is formed on a top surface of the transparent substrate, the light reflection pattern is formed of a plurality of recesses formed at given intervals P1 in parallel with the axial direction of the light source lamp, wherein assuming that intervals between stripes which are in parallel with the recesses in the arrangement of liquid cells of the reflection type liquid-crystal display device are P2, the intervals P1 are set to satisfy a relation between P1 and P2:

P1:P2=1:(N+1.3) to 1:(N+1.6)

or

P1:P2=1:1/(N+1.6) to 1:1/(N+1.3)

where N is an integer: 0, 1, 2, 3, . . . .

According to a second aspect of the present invention, the recesses comprise grooves substantially triangular in section, and flat portions are formed between the respective adjacent grooves to form the light reflection pattern consisting of the grooves and the flat portions, and an inclination angle of the groove is set so as to ensure the amount of emitted light which is substantially uniform over the entire lower surface of the transparent substrate.

Further, according to a third aspect of the present invention, the recesses comprise grooves which are substantially triangular in section, the light reflection pattern is structured such that the grooves are continuously formed, and the inclination angle of the groove is set so as to ensure the amount of emitted light which is substantially uniform over the entire lower surface of the transparent substrate.

DETAILED DESCRIPTION OF PREFERRED EMBODIMENTS

Figure 11:
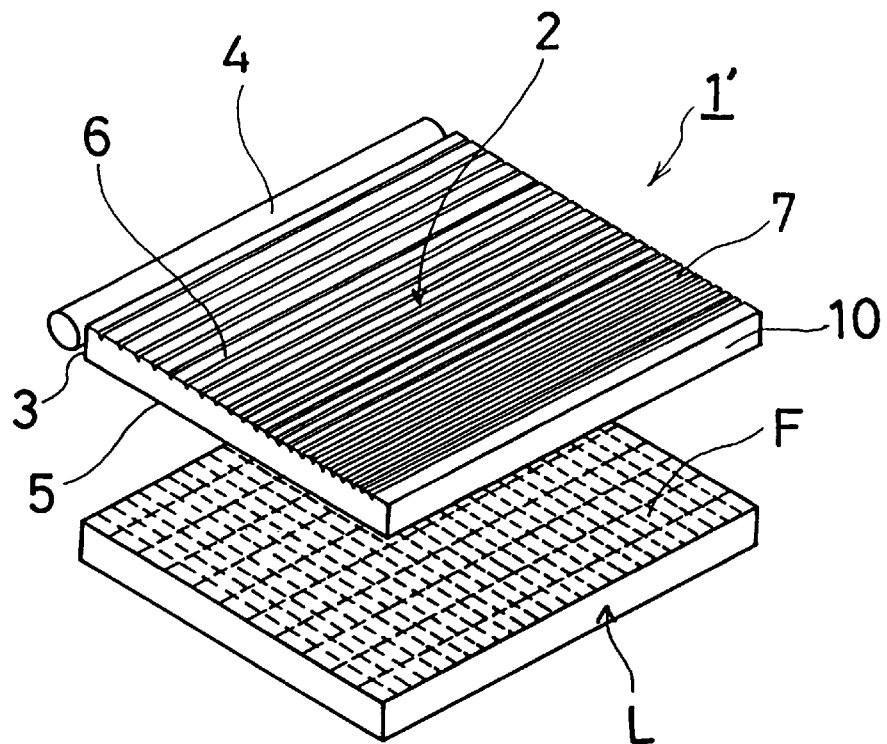
FIG. 11 is a perspective view showing the structure of a conventional transparent and spread illuminating apparatus.
Figure 12:
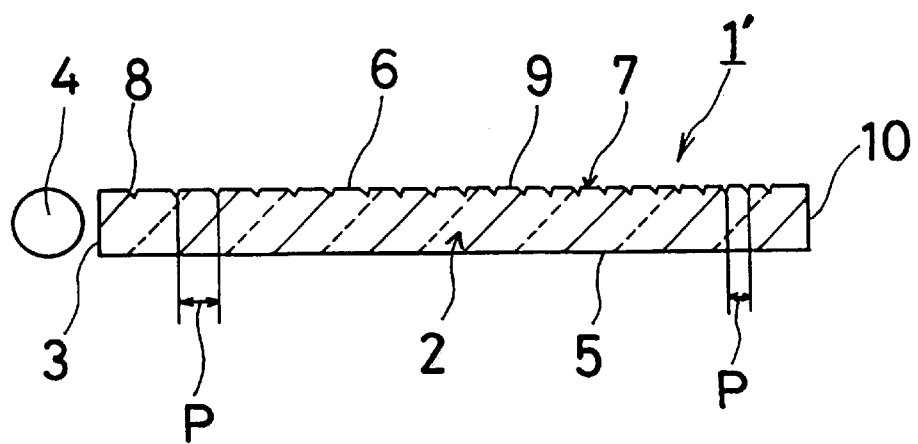
FIG. 12 is a cross-sectional view showing the structure of the transparent and spread illuminating apparatus of FIG. 11.

Now, a description will be given in more detail of the structure of a transparent and spread illuminating apparatus 1 of the present invention with reference to the accompanying drawings. The same parts as those of a transparent and spread illuminating apparatus 1' described in the above-described related art on the basis of FIGS. 11 and 12 are indicated by like references, and their detailed description will be omitted.

Figure 1:
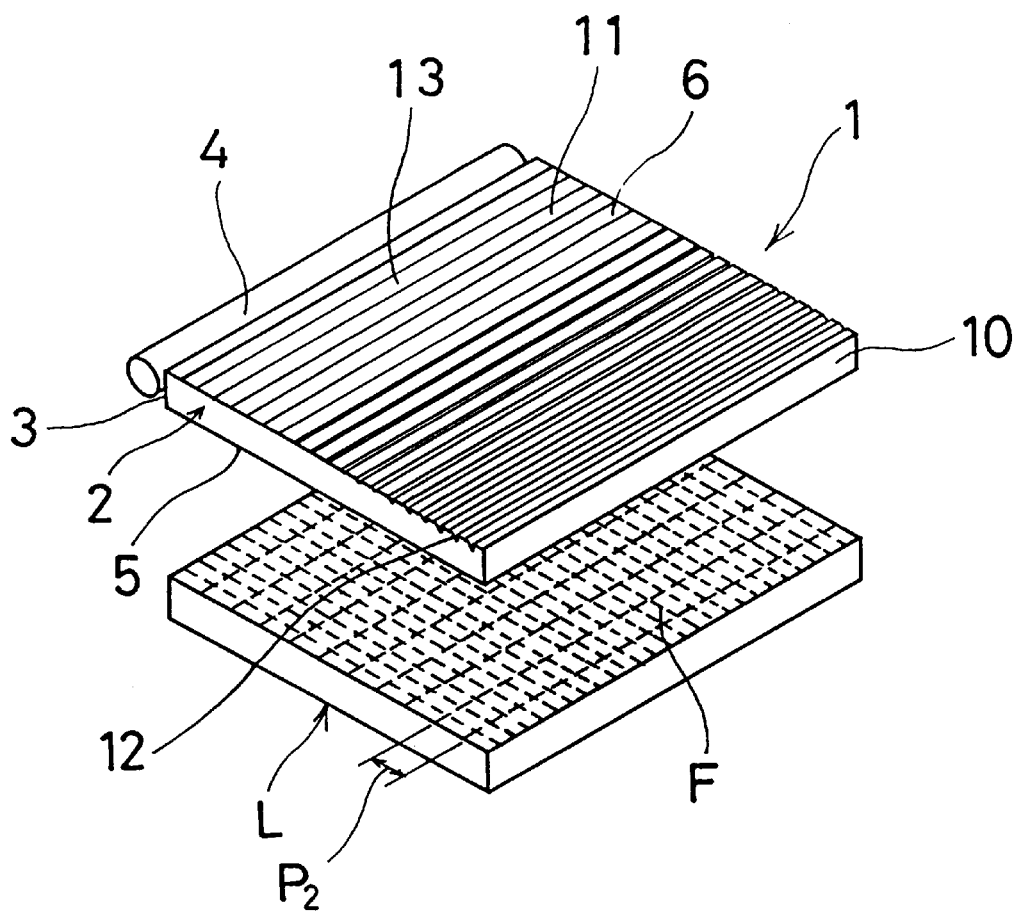
FIG. 1 is a perspective view showing a structure of a transparent and spread illuminating apparatus in accordance with the present invention.

As shown in FIG. 1, the structure of the transparent and spread illuminating apparatus 1 is substantially identical with the conventional illuminating apparatus. The transparent and spread illuminating apparatus 1 is mainly structured by a transparent substrate 2 and a light source lamp 4 and different from the conventional illuminating apparatus 1' in providing a light reflection pattern 11.

Figure 2:
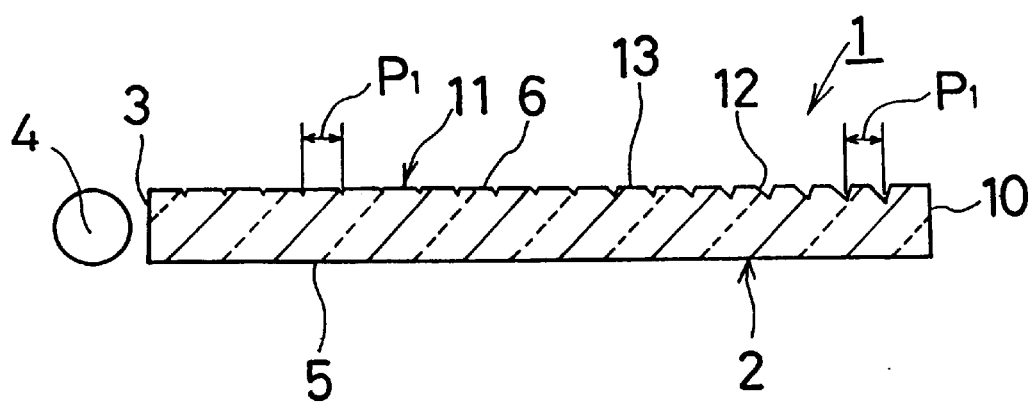
FIG. 2 is a cross-sectional view showing the structure of the transparent and spread illuminating apparatus shown in FIG. 1.

As shown in FIGS. 1 and 2, the light reflection pattern 11 is made up of grooves 12 which are substantially triangular in section and flat portions 13, and intervals P1 of valleys of the respective grooves 12 are constant. Also, the cut width and depth of the grooves 12 are made larger as the grooves are far from the light source lamp 4.

In this example, an angle of the inclination surface of the groove 12 (that is, a substantially triangular shape in section) is set in such a manner that, of the light that progresses in the transparent substrate 2, the amount of light emitted from the lower surface 5 of the transparent substrate 2 by reflection at the groove 12 is balanced with the amount of light emitted from the lower surface 5 depending on a distance from the light source lamp 4 so that the emitted light becomes nearly equal over the entire lower surface 5 of the transparent substrate 2.

In this situation, when the transparent and spread illuminating apparatus 1 of the present invention is observed in detail, it can be recognized that the occulting stripes are generated according to the intervals of the light reflection pattern 11. Since those stripes correspond to the intervals between the grooves 12, the intervals thereof are P1.

Also, the reflection type liquid-crystal display device L for actually showing the image is disposed in close contact so that its observation face F is in contact with the lower surface 5 of the transparent and spread illuminating apparatus 1 of the present invention, and the liquid-crystal display device L is an assembly of a fine mosaic pattern in which pixels (cells) are regularly disposed. For that reason, as schematically shown in FIG. 1, the lengthwise and crosswise occulting stripe pattern (indicated by a dotted line) is observed on the observation face F. In the occulting stripe pattern, it is assumed that the intervals of the stripes (pixels) which are substantially in parallel with the groove 12 of the transparent and spread illuminating apparatus 1 are P2.

In this example, the present inventors conducted an experiment in which the intervals P1 of the grooves 12 of the light reflection pattern 11 are appropriately changed, and proved that the occurrence of the moire pattern can be suppressed if the relation between P1 and P2 is defined as follows.

That is, the relation between P1 and P2 is a range of from P1:P2=1:(N+1.3) to 1:(N+1.6) or a range of from P1:P2=1:1/(N+1.6) to 1:1/(N+1.3), where N is an integer (0, 1, 2, 3 . . . ).

When P1 and P2 being set in the above ranges, the interference caused by the occulting stripes with the intervals P1 of the light reflection pattern 11 and the stripes with the intervals P2 of the pixels of the reflection type liquid-crystal device L is suppressed, therefore, a large moire pattern is not generated.

Accordingly, the intervals P1 of the light reflection pattern 11 including the grooves 12 have to be set in the above range in accordance with the pixel size (intervals) of the reflection type liquid-crystal device L.

(Embodiment)

It is observed whether a moire pattern is generated or not on the observation face of the reflection type liquid-crystal device L having the transparent and spread illuminating apparatus 1 of the present invention.

The structure of the transparent and spread illuminating apparatus 1 is identical with that described with reference to FIGS. 1 and 2, in which a transparent substrate 2 is formed of a transparent acrylic resin flat plate (sizes: 240 mm×160 mm, thickness 3 mm), and on an upper surface 6 of the transparent substrate 2 is formed a light reflection pattern 11 consisting of the grooves 12 which are in parallel with its longitudinal side and triangular in section.

Figures 3, 4:
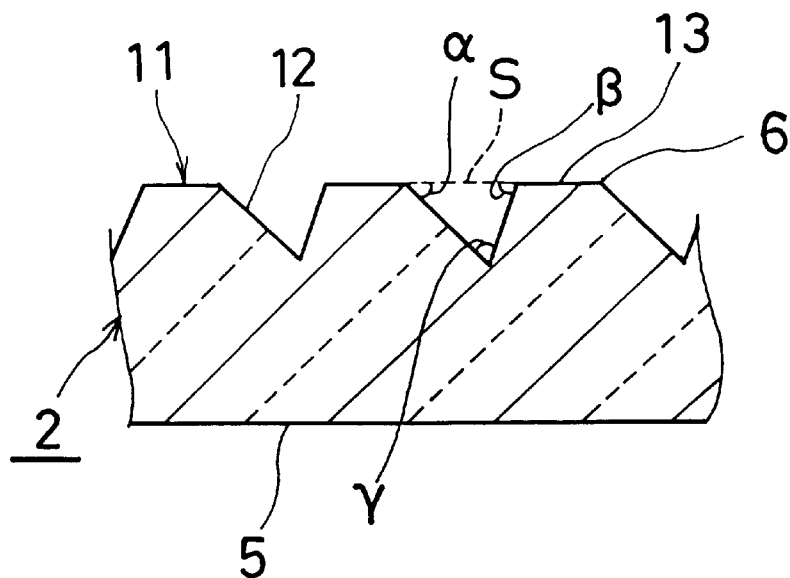
FIG. 3 is a cross-sectional view explaining a configuration of a light reflection pattern in FIG. 1.
FIG. 4 is a table for explanation of a set value of the light reflection pattern configuration in the transparent and spread illuminating apparatus in accordance with an embodiment of the present invention.

The grooves 12 of the light reflection pattern 11 are triangular in section, and in order to set an angle of inclination of the triangular grooves 12, an angle $\alpha$, an angle $\beta$ and an angle $\gamma$ are decided as shown in FIG. 3. The angle $\alpha$ is a base angle at a side closer to the light source lamp 4, among base angles of a triangle which is formed with the assumption of a virtual base S. Also, the angle $\beta$ is a base angle different from the above angle, and the angle $\gamma$ is an angle of the apex of the virtual triangle (that is, a valley portion of the grooves 12).

The grooves 12 are formed in such a manner that the angle $\gamma$ is constantly kept at 60°, and the angle $\alpha$ is continuously varied so as to be set at 48° to 58° and to 46°, from the one side end surface 3 toward the opposite surface 10, in accordance with which the angle $\beta$ is also varied. In this situation, the intervals P1 of the grooves 12 are made constant.

Further, in order to change the relative ratio of the grooves 12 to the flat portions 13, the ratio of the width of the grooves 12 to the width of the flat portions 13 is constantly set at 0.1 at a portion from one side end surface 3 to ⅓ of the length between the one side end surface 3 and the opposite surface 10, and toward an opposite surface 10 from the point of the ⅓ of the length between the one side end surface 3 and the opposite surface 10 toward the opposite surface 10 the cut width of the grooves 12 is gradually increased so that the ratio is set at 1.2 in the vicinity of the opposite surface 10.

Then, a cold cathode fluorescent tube 2.3 mm in outer diameter $\phi$ is used as the light source lamp 4 and abuts on the one side end surface 3. Then, the light source lamp 4 is turned on by an invertor with a tube current 3.5 mA and sine waves of a lightening frequency 60 KHz.

In addition, although not shown in FIGS. 1 and 2, there is provided a lamp reflector formed of any one of a reflection film in which metal of white, silver or the like is evaporated, and a reflection plate resulting from bending a metal plate such as an aluminum plate applied to a mirror finishing process so that an outer surface of the light source lamp 4 which is not faced on the one side end surface 3 is covered therewith, thereby, a light emitted from the light source lamp 4 is allowed to progress in the transparent substrate 2 with a high efficiency.

Also, the side end surfaces of the transparent substrate 2 except for the one side end surface 3 where the light source lamp 4 are disposed is covered with a reflection member in order to increase the amount of light for illumination.

The reflection type liquid-crystal device L which is substantially identical in size with the transparent substrate 2 is disposed on the back surface of the transparent and spread illuminating apparatus 1 thus structured, and an image is observed. When the occulting stripes generated on the observation face of the reflection type liquid-crystal device L are measured in advance in order to determine the intervals P1 of the grooves 12, the intervals P2 of occulting stripes which are in parallel with the grooves 8 are 0.33 mm as a result of measurement.

The intervals P1 of the grooves 12 are set on the basis of the intervals P2 (0.33 mm), fourteen-samples are prepared as shown in the table of FIG. 4, and an image is observed, respectively.

As a result of observing the image, as shown in FIG. 4, a sample where the moire pattern is strongly generated is indicated by X (more stronger moire pattern is indicated by XX), a sample where the moire pattern is weakly generated is indicated by ○, and a sample where the degree of the moire pattern is intermediate is indicated by Δ.

As is apparent from FIG. 4, the occurrence of a large moire pattern can be suppressed in a range of from P1:P2= 1:1.3 to 1:1.6 or a range of from P1:P2=1:1/1.6 to 1:1/1.3. Accordingly, the transparent and spread illuminating apparatus 1 according to the present invention is added to the reflection type liquid-crystal device L, thereby to make it possible that the apparatus is used without being influenced by the brightness of surroundings and suppresses the occurrence of the moire pattern, as a result of which the screen is more easily observed.

In addition, as described above, since the moire pattern is generated by an interference caused by the occulting stripes with the interval P1 of the light reflection pattern 11 and the stripes with the interval P2 which are made by the pixels of the reflection type liquid-crystal device L, this can be generalized as follows, that is, the occurrence of the moire pattern can be suppressed in a range of from P1:P2=1:(N+ 1.3) to 1:(N+1.6) or a range of from P1:P2=1:1/(N+1.6) to 1:1/(N+1.3), where N is an integer (0,1,2,3 . . . ). Although N can become logically increased with no limit as long as N is an integer, it is desirable that an range of from 0 to 3 is taken in a practical use in order to actually form the grooves 12.

Figure 5:
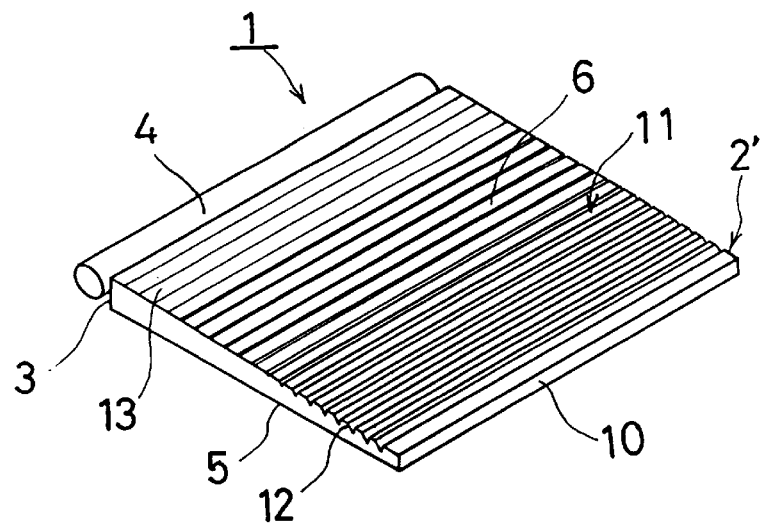
FIG. 5 is a perspective view showing a structure of a transparent and spread illuminating apparatus different from that of FIG. 1.
Figure 6:
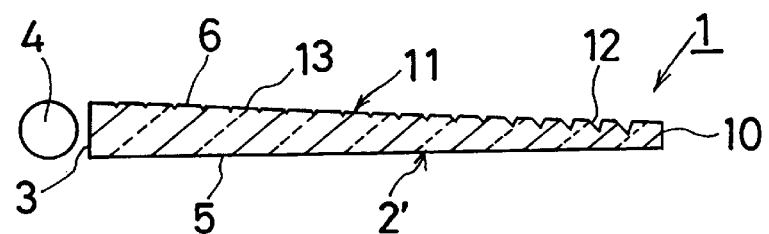
FIG. 6 is a cross-sectional view showing the transparent and spread illuminating apparatus of FIG. 5.

In the transparent and spread illuminating apparatus 1 of the present invention as described above, in order to more lighten a weight of the apparatus, the transparent substrate 2' may be shaped substantially in a wedge as in the transparent and spread illuminating apparatus 1 as shown in FIGS. 5 and 6. In this situation, the transparent substrate 2' is designed in such a manner that the thicker side surface in parallel with the grove 12 is set as one side end surface 3, and its thickness is reduced toward the opposite surface 10.

Figure 7:
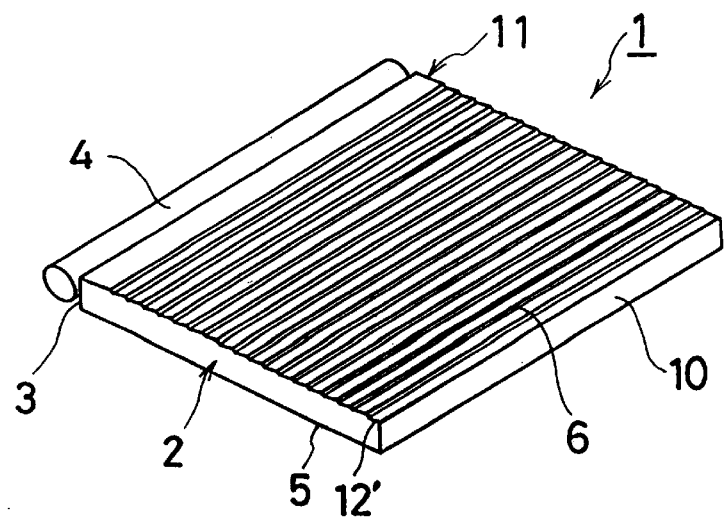
FIG. 7 is a perspective view showing a structure of a transparent and spread illuminating apparatus different from that of FIG. 5.
Figure 8:
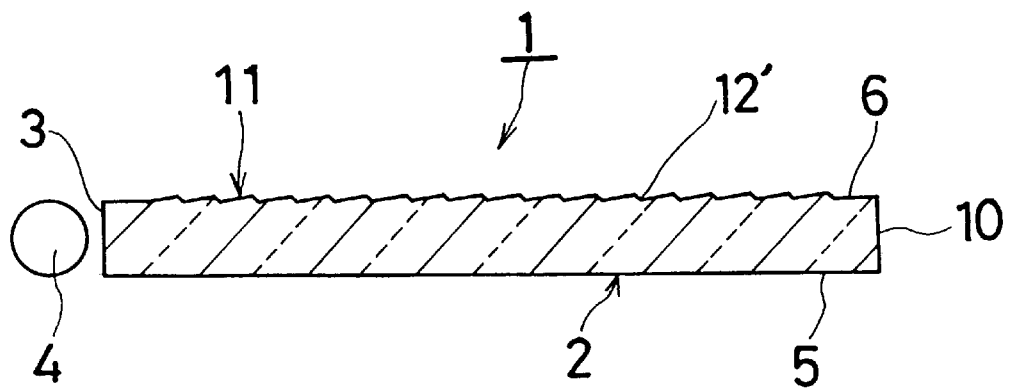
FIG. 8 is a cross-sectional view showing the structure of the transparent and spread illuminating apparatus of FIG. 7.

In this case, the light reflection pattern 11 formed on the upper surface 6 of the transparent substrate 2 is structured by the grooves 12 and the flat portions 13, however, in the present invention, since it is sufficient that the light reflection pattern 11 is formed so that it does not interfere with the occulting stripes caused by the pixels of the reflection type liquid-crystal device L in order to suppress the generation of the moire pattern, the present invention is not limited to only the above structure. As shown in FIGS. 7 and 8, the light reflection pattern may be formed by continuously forming the grooves 12' in parallel with the light source lamp 4 (that is, there is no provision of the flat portions 13).

Figure 9:
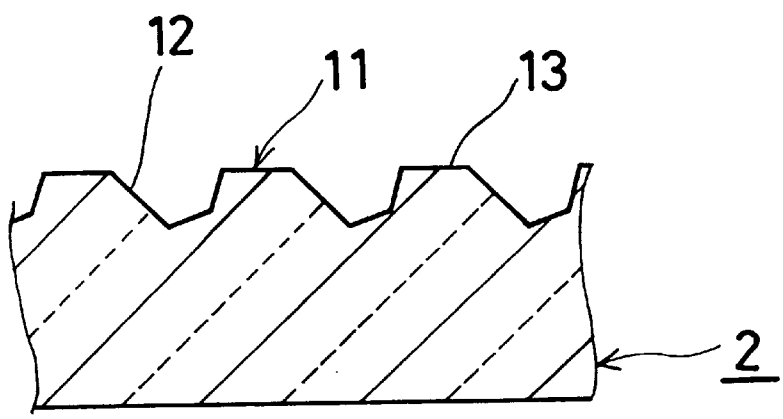
FIG. 9 is a cross-sectional view explaining a configuration of a light reflection pattern different from that of FIG. 1.
Figure 10:
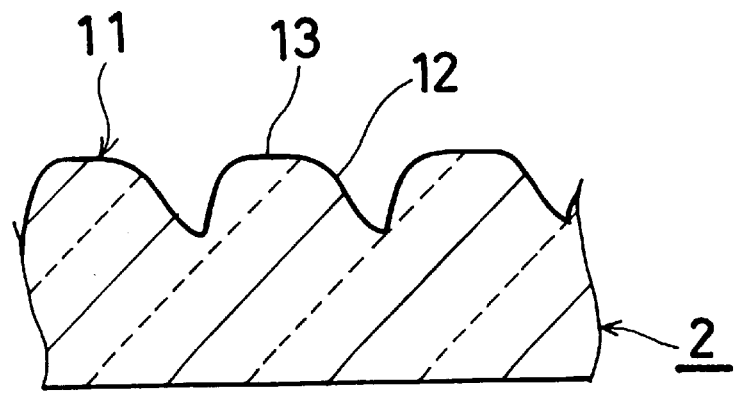
FIG. 10 is a cross-sectional view explaining a configuration of a light reflection pattern different from that of FIG. 9.

Further, the sectional configuration of the grooves 12 is not limited to a triangle as in this embodiment, but can appropriately be formed so that the amount of emitted light becomes nearly uniform everywhere on the lower surface 5 side of the transparent substrate 2. For example, it may be a four-sided figure as shown in FIG. 9 or a polygon having angles more than those of the four-sided figure. In addition, it may be structured by a curved surface as shown in FIG. 10 which is made in such a manner as each inclined surface of the polygon as shown in FIG. 9 is smoothly connected with each other.

A machining process for forming the grooves 12 of the light reflection pattern 11 can be implemented by cutting due to a diamond turning tool. In this case, since the turning tool for machining is employed while being fixed, an angle γ of a valley portion corresponding to the apex of the grooves 12 which are nearly triangular in section becomes constant. As a result, a sum of the inclined angle α and the inclined angle β is always kept constant, but as described above in the actual producing of the light reflection pattern 11 in the embodiment, the inclined angle α and the inclined angle β are defined so as to be appropriately changed within a variable range, to thereby realize spread illumination more efficiently.

In manufacturing the transparent and spread illuminating apparatus 1 of the present invention, the transparent substrates 2 and 2' may be made of a material that allows the light to pass therethrough with a high efficiency, and is most preferably made of acrylic resin from the viewpoint of its transparency and workability in processing. However, in the implementation of the present invention, the material of the transparent substrates 2 and 2' is not limited to acrylic resin, and may be made of various thermoplastic transparent resin such as vinyl chloride resin, polycarbonate resin, olefin resin or styrene resin, etc. Also, thermosetting transparent resin such as epoxy resin, allyldiglycol carbonate resin or the like, or inorganic transparent material such as various glass material or the like may be applicable if occasions demand.

In addition, a method of producing the transparent substrates 2 and 2' can be made by directly machining such as cutting or grinding, and in case of resin material, various molding methods such as cast molding, extrusion molding, thermo-setting molding or injection molding are applicable. The injection molding method using resin material is most preferable in view of productivity.

As is described above, according to the present invention, there is provided a transparent and spread illuminating apparatus closely disposed to cover a surface of a reflection type liquid-crystal display device, in which a light source lamp is closely disposed along at least one side end surface of a transparent substrate made of a transparent material, a light reflection pattern is formed on a top surface of the transparent substrate, the light reflection pattern is formed of a plurality of recesses formed at given intervals P1 in parallel with the axial direction of the light source lamp, wherein assuming that intervals between stripes which are in parallel with the recess portions in the arrangement of liquid cells of the reflection type liquid-crystal display device are P2, the intervals P1 are set to satisfy a relation between P1 and P2:

P1:P2=1:(N+1.3) to 1:(N+1.6)

or

P1:P2=1:1/(N+1.6) to 1:1/(N+1.3)

where N is an integer: 0, 1, 2, 3, . . . . Therefore, the interference caused by the occulting stripes with the interval P1 of the light reflection pattern and the stripes with the interval P2 due to the pixels of the reflection type liquid-crystal device L is suppressed, to thereby suppress the occurrence of a large moire pattern.

Accordingly, since the emission light from the light source lamp progresses in the interior of the transparent substrate and is emitted from the back surface, and then enters the reflection type liquid-crystal device, the observation face of the reflection type liquid-crystal device is irradiated by said light, thereby to enable to ensure the luminance, and also since the occurrence of the moire pattern is suppressed so that the image is readily observed.

Further, since the transparent substrate is made of a transparent material, even if it is structured to cover the surface of the member to be illuminated, the image can be observed, and also they are formed in a unit with each other, it is suitable for a portable use.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A transparent and spread illuminating apparatus closely disposed to cover a front surface of a reflection type liquid-crystal display device, in which a light source lamp is closely disposed along at least one side end surface of a transparent substrate made of a transparent material, a light reflection pattern is formed on a top surface of said transparent substrate, said light reflection pattern is formed of a plurality of recesses formed at given intervals P1 in parallel with an axial direction of said light source lamp, wherein assuming that intervals between stripes which are in parallel with said recesses in the arrangement of liquid cells of said reflection type liquid-crystal display device are P2, wherein P1 and P2 satisfy the following relation:

P1:P2=1:(N+1.3) to 1:(N+1.6)

or

P1:P2=1:1/(N+1.6) to 1:1/(N+1.3)

where N is an integer: 0, 1, 2, 3, . . . .

2. A transparent and spread illuminating apparatus as claimed in claim 1, wherein said recesses are formed as grooves substantially triangular in section, flat portions are formed between the respective adjacent grooves to form said light reflection pattern consisting of said grooves and said flat portions, and an inclination angle of said groove is set so as to ensure the amount of emitted light which is substantially uniform over the entire lower surface of said transparent substrate.

3. A transparent and spread illuminating apparatus as claimed in claim 1, wherein said recesses are formed as grooves which are substantially triangular in section, said light reflection pattern is structured such that said grooves are continuously formed, and an inclination angle of said groove is set so as to ensure the amount of emitted light which is substantially uniform over the entire lower surface of said transparent substrate.

* * * * *